March 19, 1957 R. K. STEINBERG 2,785,859

CARRY CIRCUIT FOR PARALLEL OPERATED ACCUMULATOR

Filed Dec. 28, 1950 2 Sheets-Sheet 1

INVENTOR
RICHARD K. STEINBERG
BY Dwight D. Mooney
ATTORNEY

March 19, 1957 R. K. STEINBERG 2,785,859

CARRY CIRCUIT FOR PARALLEL OPERATED ACCUMULATOR

Filed Dec. 28, 1950 2 Sheets-Sheet 2

INVENTOR
RICHARD K. STEINBERG
BY Dwight D. Mooney
ATTORNEY

United States Patent Office 2,785,859
Patented Mar. 19, 1957

2,785,859

CARRY CIRCUIT FOR PARALLEL OPERATED ACCUMULATOR

Richard K. Steinberg, Poughkeepsie, N. Y., assignor to International Business Machines Corporation, New York, N. Y., a corporation of New York Application December 28, 1950, Serial No. 203,194

7 Claims. (Cl. 235—133)

This invention relates to accumulators and more particularly to a novel carry circuit for a parallel accumulator.

A conventional carry circuit effects carry from one order of the accumulator to the next higher order when the lower order arrives at the zero position. The actual carry is effected intermediate the application of pulses to the accumulator and is initiated after the lower order arrives at the zero position. However, if the carry operation necessitates a carry in response to a carry from a lower order the whole carry operation may not be finished when the calculator again applies input pulses to the accumulator because of the excessive time consumed in effecting the carry operation. Such a condition, therefore, limits the operable speed of the accumulator.

A principal object of this invention is to provide a novel carry arrangement which eliminates the above disadvantage.

Another object is to provide a carry circuit wherein the carry operation is initiated in response to an indication that a preselected digit stored in a counter is no longer stored therein.

A further object is to provide a novel carry circuit wherein the carry operation to each order of a decade accumulator is initiated as the indication of the quantity stored in the next lower order of the accumulator passes from or leaves the position indicating the storage of the digit 9.

Other objects of the invention will be pointed out in the following description and claims and illustrated in the accompanying drawings, which disclose, by way of an example, the principle of the invention and the best mode, which has been contemplated, of applying that principle.

Briefly, the invention comprises a gaseous counter tube of the glow transfer type for each order of the accumulator. Such a tube is set forth in application Serial No. 192,199, filed October 26, 1950, and includes ten digit representing cathodes arranged in a closed glow transfer path and corresponding to the digits 0–9 respectively. A glow transfer cathode is interposed between successive digit representing cathodes, a total of ten glow transfer cathodes being provided. A single anode is common to the twenty cathodes.

A selectively controlled digit input switch is provided to advance the glow discharge in the counter tube from one digit representing cathode to the next adjacent one, via the transfer cathode intermediate the two digit representing cathodes, in response to each pulse to be stored which pulse is applied to the digit input switch. A connection is provided from the cathode representing the digit 9 to a carry storage trigger circuit. Each time a voltage change is applied to the counter tube which causes the glow discharge to be transferred from the cathode representing the digit 9 a voltage change is transferred to the carry storage trigger circuit to cause it to be switched to a preselected one of its two stable conditions. When the carry storage trigger circuit is in this one preselected condition, it applies a voltage to a carry input switch of the next higher order of the accumulator. This voltage conditions the carry input switch to be responsive to a subsequent carry signal applied to it. When the carry input switch so responds, it applies a voltage change to the counter tube of that order, causing it to effect the storage of an additional digit. Carry is effected after the last pulse of any given series of pulses to be counted has been applied to the digit input switch. The invention institutes the carry process as soon as a certain pulse to be stored institutes a glow transfer within the counter tube rather than after storage of that pulse has been effected by the counter tube. By utilizing such a process, there is always sufficient time to complete the carry operation before subsequent pulses to be counted are applied. On the other hand if carry is instituted after storage has been effected by the counter tube, there is not sufficient time to effect the full carry operation when carry is to be effected in response to carry from lower orders.

Figure 1:
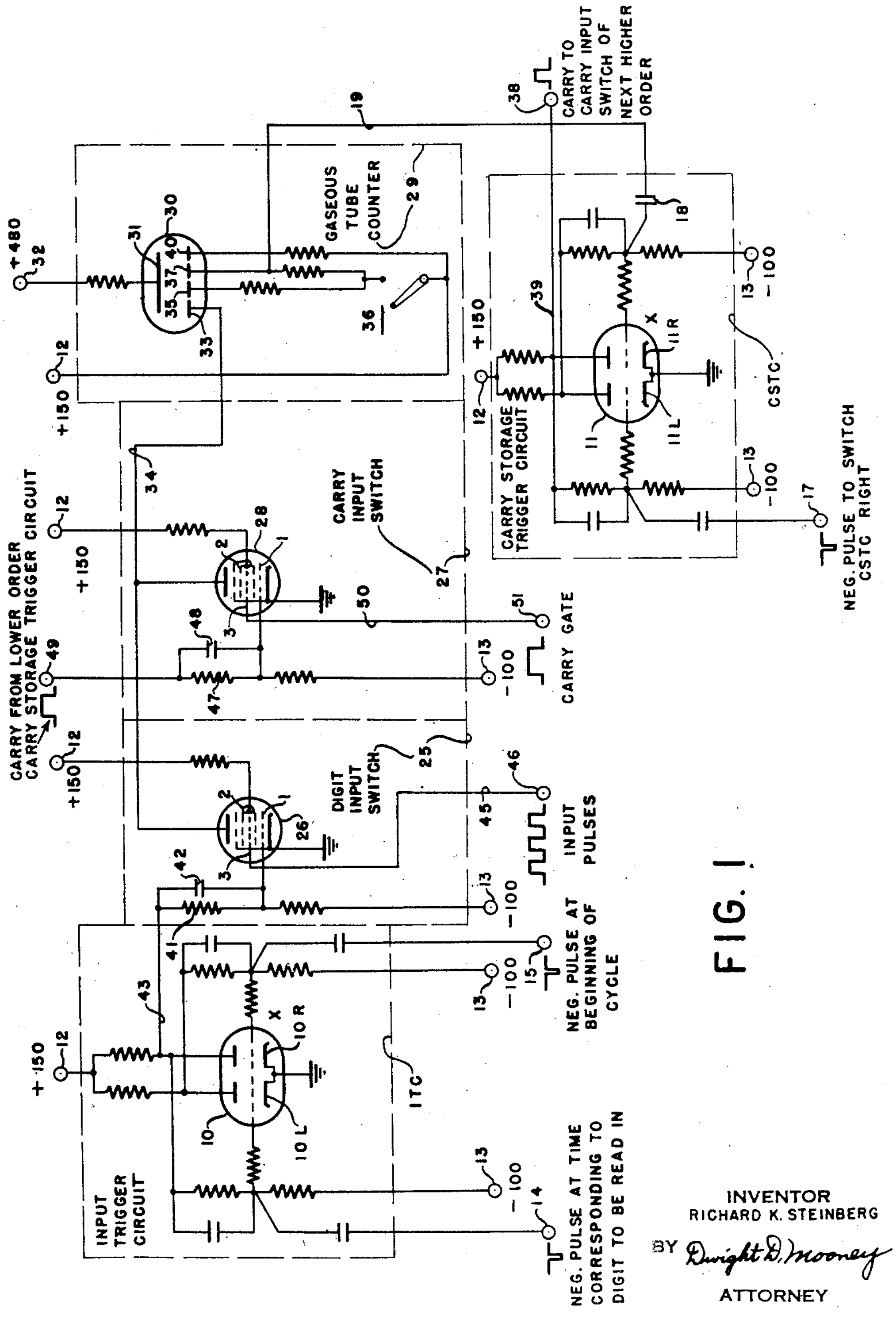
Fig. 1 is a circuit diagram showing one embodiment of the invention.

Referring more particularly to Fig. 1, there is shown the complete carry circuit for one order of a parallel type accumulator. As the description proceeds, it will become increasingly obvious that the particular circuit arrangement shown is suitable for use in a card controlled calculator or any other type calculator where the complete cycle of operation is divided so that each function to be performed is always performed during the same period of each cycle.

Two trigger circuits of the type employing two grid controlled tubes and having two stable conditions alternately assumed in response to pulses applied to the control grids of those trigger circuits are used in the carry circuit. These trigger circuits are the input trigger circuit ITC and the carry storage trigger circuit CSTC, respectively, each trigger circuit being enclosed within the dotted lines as shown. A single envelope including two triode tube sections is used in each trigger circuit. The tube used in the trigger circuit ITC is designated by 10 and the tube used in the trigger circuit CSTC is designated by 11. The left hand sections of the tubes are designated 10L and 11L respectively and the right hand sections are designated 10R and 11R respectively. When a trigger circuit is in one of its stable conditions one section of the tube is conductive and the other nonconductive and when the trigger circuit is in its other stable condition, the conductive conditions of the tube sections are reversed.

To clarify the description herein, a trigger circuit is referred to as being in the Left condition when the L section of its tube is conductive, and is referred to as being in the Right condition when the R section of its tube is conductive. The *x* mark to the lower right of the tubes 10 and 11 indicates that the trigger circuits ITC and CSTC respectively are initially in the Right condition.

The cathodes of the tubes 10 and 11 are connected directly to ground. Each plate of the tubes is connected through a resistor to a +150 volt terminal 12. The control grid of each section of each tube is connected, through a parasitic suppressor resistor in series with a resistor and a capacitor connected in parallel, to the plate of the other section of that tube. Each control grid is connected through an appropriate bias resistor to a −100 volt terminal 13. The control grids of the tube sections 10L and 10R respectively, are connected through appropriate coupling capacitors to the respective terminals 14 and 15.

If the trigger circuit ITC is initially in the Right condition the tube section 10R is conductive and the tube section 10L is non-conductive. The voltage at the plate of the tube 10R is therefore low and holds the control grid of the tube 10L at a voltage below its cutoff value. The application of a negative voltage pulse to the terminal 14 is therefore ineffective to change the stable condition of the trigger circuit. However, if a negative pulse is applied to the terminal 15, it causes the voltage on the control grid of the tube section 10R to be decreased in value. This causes less conduction through the tube section 10R and a corresponding increase in the voltage at its plate. The increased voltage is transferred through the parallel connected resistor and capacitor and the parasitic resistor in series with them to the control grid of the tube section 10L to increase its voltage above the cut off value and initiate conduction through the tube section 10L. The voltage at the plate of the tube section 10L is accordingly decreased, and this decreased voltage is transferred to the control grid of the tube section 10R to further decrease the voltage on that grid. This accumulative action is continued until the tube section 10L is fully conductive and the tube section 10R is non-conductive, thereby placing the trigger circuit ITC in the Left condition. The application of a negative pulse to the terminal 14 now causes a similar action to switch the trigger circuit to its initial Right condition.

The trigger circuit CSTC is switched from each stable condition to the other exactly as the trigger cricuit ITC. The control grid of the tube section 11L is connected through an appropriate capacitor to a terminal 17. The application of a negative pulse to the terminal 17 will switch the trigger circuit from the Left to the Right condition if the trigger circuit is not already in the Right condition and if it is then the pulse will have no effect on its stable condition. The control grid of the tube section 11R is connected through a capacitor 18 to a lead 19. The application of a negative pulse to the lead 19 will switch the trigger circuit CSTC from the Right to the Left condition if it is in the Right condition just prior to the application of the pulse, if the trigger circuit was in the Left condition just prior to the application of the negative pulse it will have no effect upon the stable condition of the trigger circuit.

It is possible to design trigger circuits which are relatively insensitive to positive pulses, the trigger circuits being thereby normally switchable from each stable condition to the other only in response to negative pulses. However, such design is not necessary here because positive pulses are never applied to either grid of the trigger circuit ITC or to the grid of the tube section 11L of the trigger circuit CSTC. A positive pulse will reach the grid of tube section 11R in the trigger circuit CSTC each time the glow in the gaseous counter tube arrives at the cathode representing the digit 9, but in all such cases the trigger circuit CSTC will already have been placed in the Right condition by a negative pulse applied to the terminal 17 and the positive pulse will therefore have no effect upon the stable condition of the trigger circuit.

The remaining portion of the novel carry circuit of the invention comprises a digit input switch 25 which includes the multi-grid tube 26, a carry input switch 27 which includes the multi-grid tube 28, and a gaseous tube counter 29 which includes the transfer glow discharge tube 30 described in detail in the application above referred to. Each of these circuit elements is enclosed by dotted lines on Fig. 1.

The tube 30 is shown diagrammatically. The common anode 31 is connected through an appropriate resistor to a +480 voltage terminal 32. The electrode 33 represents the ten transfer cathodes of the tube which are connected together through a lead 34 and to the plates of the tubes 26 and 28. The electrode 35 represents the digit representing cathodes which are representative of the digits 1–8 inclusive which are commonly connected together and through an appropriate resistor and a reset switch 36 to a +150 voltage terminal 12. The electrode 37 is also connected by lead 19 and capacitor 18 to the carry storage trigger circuit CSTC to effect carry to the next higher order. Such carry is indicated by the presence of a positive voltage at the terminal 38 connected by a lead 39 to the plate of the tube section 11R of the carry storage trigger circuit CSTC. The electrode 40 represents the digit 0 and is connected through an appropriate resistor to a +150 volt terminal 12. The reset switch 36 is used as set forth in the application referred to in order to place the tube 31 in its zero or starting condition so that the glow discharge exists in stable equilibrium between the cathodes representing the digit 0 (electrode 40) and the anode.

The cathodes of the tubes 26 and 28 of the digit and carry input switches respectively are connected directly to ground. The grid 1 of the tube 26 is connected by the resistor 41 and capacitor 42 in parallel and a lead 43 to the plate of the tube section 10R of the input trigger circuit. Bias voltage is applied to the grid 1 of the tube 26 through an appropriate resistor connected to a −100 voltage terminal 13. Grid 2 of the tube 26 is connected through an appropriate resistor to a +150 volt terminal 12. Grid 3 of the tube 26 is connected by a lead 45 to a terminal 46 connected to the source of positive input pulses to be stored.

Grid 1 of the tube 28 of the carry input switch 27 is connected through a resistor 47 and a capacitor 48 in parallel to a terminal 49 to which a positive carry pulse is applied from the next lower order when carry is to be effected from that order to the order shown. Bias voltage is applied to the grid 1 of the tube 28 through an appropriate resistor connected to a −100 volt terminal 13. Grid 2 of the tube 28 is connected through an appropriate resistor to a +150 volt terminal 12. Grid 3 of the tube 28 is connected by a lead 50 to a terminal 51 to which the positive carry gate pulse is applied following the read in cycle.

In order for the tube 26 to be plate current conductive it is necessary that its grids 1 and 3 be positive. Hence, the input trigger circuit ITC must be in the Left condition so that each positive input pulse applied to the terminal 46 will render the tube 26 conductive and thereby apply a reduced voltage to all the transfer cathodes (electrode 33) of the tube 30 during the time the tube 26 is conductive. Such a voltage will cause the glow discharge to be transferred from between the digit representing cathode to which it exists and the common anode, over the transfer cathode intermediate the glow discharge and the next higher digit representing cathode, to exist in stable equilibrium between the next higher digit representing cathode and the common anode.

Similarly, the tube 28 of the carry input switch 27 is plate current conductive only when its grids 1 and 3 are positive. Hence, if a carry is indicated from the next lower order a positive voltage will be applied to the terminal 49 and the grid 1 will be made positive. Then when the carry gate signal is applied to the terminal 51 the grid 3 becomes positive and the tube 28 is rendered plate current conductive. A decreased voltage is then applied over the lead 34 to the electrode 33 of the tube 30. At the end of the carry gate signal the voltage applied to electrode 33 will be returned to its more positive value and one additional digit will have been stored by the tube 30 in the same manner as when the tube 26 of the digit input switch 25 is rendered plate current conductive.

The input trigger circuit ITC is normally in the Right condition and the decreased voltage at the plate of the tube section 10R is applied to the grid 1 of the tube 26 so that it cannot be rendered plate current conductive in response to pulses applied to the grid 3.

At the beginning of the read in cycle a negative pulse is applied to the terminal 15 to switch the input trigger circuit from the Right to the Left condition thereby placing an increased voltage on the grid 1 of the tube 26. Input pulses are then applied to the terminal 46 and render the grid 3 of tube 26 positive to cause that tube to become plate current conductive during the duration of each input pulse. Each such pulse causes a decreased voltage to be transferred over the lead 34 to the electrode 33 of the tube 30 to effect the storage of a digit in the tube 30.

The calculator controls the quantity stored in each counter of the accumulator during each read in cycle. This control is manifested by the application of a negative pulse to the terminal 14 connected to the input trigger circuit ITC after the desired number of input pulses have been applied to the terminal 46 connected to the grid 3 of the tube 26 of the input switch. This negative pulse causes the input trigger circuit to switch from the Left to the Right condition thereby placing a decreased voltage on the grid 1 of the tube 26 and rendering the digit input switch nonresponsive to the input pulses.

If during the read in cycle 9 digits are stored in the tube 30 a glow discharge exists between the common anode 31 and the electrode 37 representing the digit 9. This causes the voltage at the electrode 37 to increase and such increase is applied over the lead 19 and capacitor 18 to the control grid of the tube section 11R of the carry storage trigger circuit CSTC. This increased voltage does not effect the stable condition of the trigger circuit because it is already in the Right condition.

If the 10th digit is stored during a read in cycle there is a certainty when the glow discharge leaves or is transferred from the electrode 37 that the tube 30 will be returned to its initial condition. When the glow discharge leaves the electrode 37 that electrode again has a decreased voltage applied to it. This decreased voltage causes the carry storage trigger circuit to be switched from the Right to the Left condition. The resulting increased voltage at the plate of the tube section 11R is transferred over the lead 39 to the terminal 38 connected to the grid 1 of the tube of the carry input switch of the next higher order.

After the read in cycle has been completed, a positive carry gate pulse is applied to the terminal 51 connected to the grid 3 of the tube 28 of the carry input switch. If the grid 1 of tube 28 is positive as a result of a carry from the next lower order of the accumulator, as described above, the carry gate pulse will cause the tube 28 to be rendered plate current conductive and a decreased voltage to be applied over the lead 34 to the tube 30. This decreased voltage causes the glow in the tube 30 to transfer to the next intermediate cathode. If this glow transfer caused the glow discharge to leave the electrode 37, such would effect a switching of the carry storage trigger in the manner previously described, and carry would have been instituted by carry from a lower order. The use of the decreased voltage resulting from the glow discharge leaving the cathode representing the digit 9 to initiate carry enables the completion of carry in response to carry from a lower order while the carry gate pulse is still being applied to the terminal 51.

The duration of the carry gate signal is long enough to allow the operation of a carry being produced by a carry from a lower order to proceed through all orders of the accumulator. At the end of the carry gate signal, when the potential applied to terminal 51 is again made negative, the glow in each counter which received a carry signal advances from the intermediate cathode to which the carry signal caused it to be transferred to the next succeeding digit representing cathode. The process of adding a number in parallel fashion including the addition of carries according to the rules of arithmetic has now been completed.

If the voltage change resulting from the arrival of the glow discharge at the cathode representing 0 is used to initiate the carry, there is insufficient time to effect the entire carry operation in response to the carry gate signal. It would be necessary to apply a series of carry gate signals to terminal 51 to handle those cases where a carry is produced by a carry from the next lower order. It would also be necessary to make provision for the prevention of entering two or more carry counts into the counter of said next lower order. Obviously, such constitutes a substantial redesign of the calculator; such redesign is rendered unnecessary by the invention.

After completion of the carry operation a negative pulse is applied to the terminal 17 connected to the carry storage trigger circuit CSTC to switch it to the Right condition. Before storage is again effected a negative pulse is applied to the terminal 15 connected to the input trigger circuit ITC to switch is to the Left condition.

Figure 2:
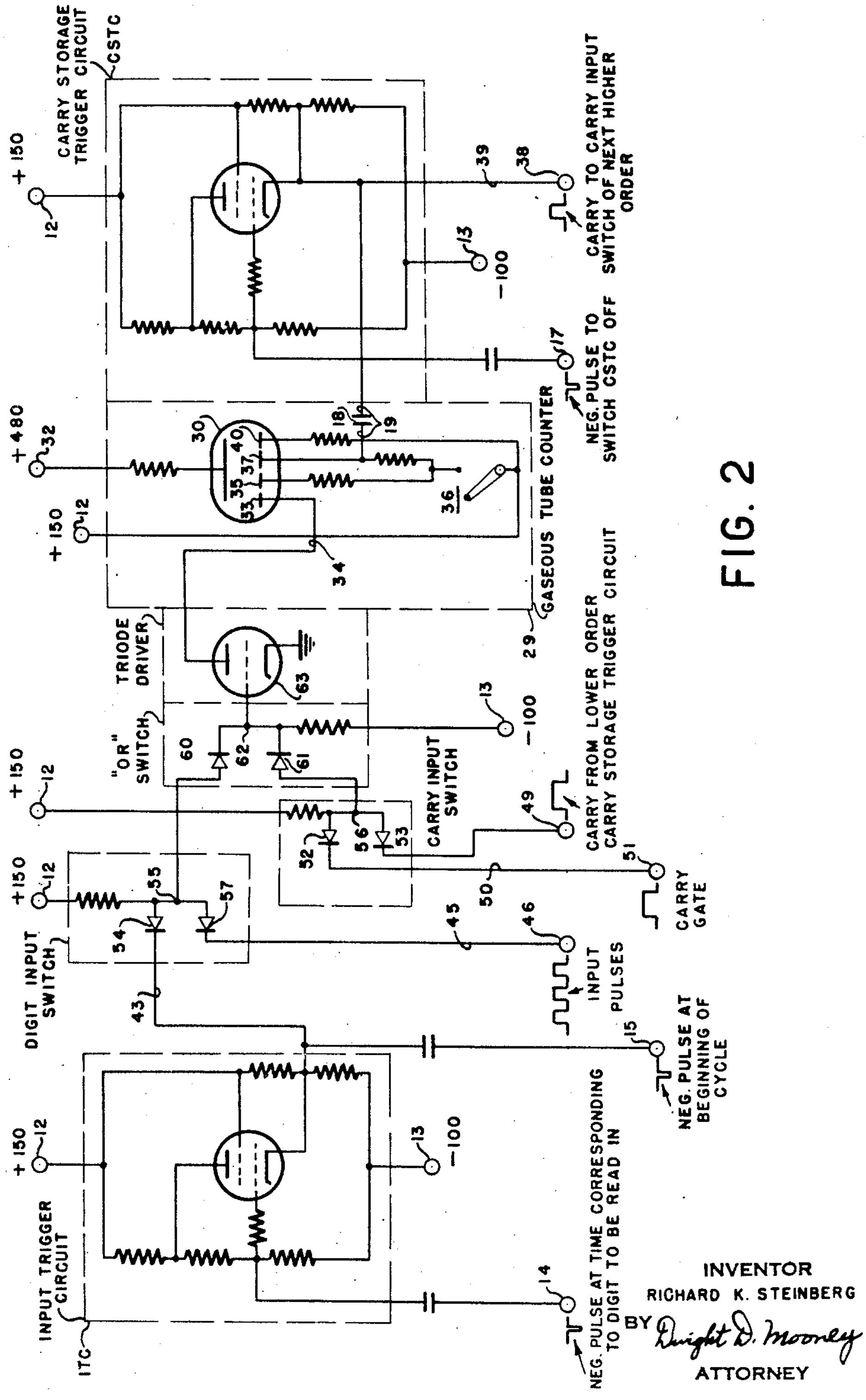
Fig. 2 is a circuit diagram showing another embodiment of the invention.

Referring to Fig. 2, there is shown a different circuit arrangement for performing the same function as the circuit of Fig. 1. The input trigger circuit and the carry storage trigger circuit of Fig. 1 have been replaced by trigger circuits of the secondary emission type employing a single electron tube and having two stable conditions. This trigger circuit is described in detail in U. S. Patent No. 2,631,233, issued March 10, 1953. Suffice it to say, that the trigger circuit has "on" and "off" stable conditions corresponding to dynode current conduction and non-dynode current conduction of the electron tube respectively. It will be seen that the input trigger circuit ITC is initially in the "off" condition so that the tube is passing no current in its dynode circuit. Before the read in cycle is initiated a negative pulse is applied to the terminal 15 thereby rendering the tube of the input trigger circuit conductive and switching it to the "on" condition. As a result the voltage at the cathode of the tube becomes positive.

In Fig. 2 the digit input switch comprises two rectifiers 54 and 57 and the carry input switch comprises two rectifiers 52 and 53. One terminal of the rectifier 54 is connected to the lead 43 connected at its other end to the cathode of the tube of the input trigger circuit. The other terminal of the rectifier 54 is connected through an appropriate resistor to a +150 volt terminal 12. One terminal of the rectifier 57 is connected to the lead 45 to which is applied the input pulses to be stored. The other terminal of the rectifier 57 is connected to the same +150 volt terminal 12 as is one terminal of the rectifier 54, the place of common connection of the rectifiers being referred to herein as the point 55.

When the input trigger circuit is in the "on" condition, a positive voltage is transferred over the lead 43 to the rectifier 54, but the voltage at point 55 remains at a negative value because of the conduction through the rectifier 57. There is negligible conduction through rectifier 54 because of high resistance to voltages in the reverse direction. Also, the application of input pulses to the rectifier 57, via lead 45 and terminal 46, causes a positive voltage to be applied to rectifier 57 but the voltage at the point 55 remains at a negative value if a negative voltage is applied to rectifier 54 because of the conduction through rectifier 54. However, if positive voltages are applied to rectifiers 54 and 57 simultaneously, the voltage at the point 55 is positive. For this reason the rectifiers 54 and 57 may be referred to as an "and" switch.

Rectifiers 52 and 53 are connected to function as an "and" switch in a manner similar to the connection of the rectifiers 54 and 57. Rectifiers 52 and 53 are commonly connected at a point 56 and through an appropriate resistor to a +150 volt terminal 12, the other terminal of the respective rectifiers is connected to the terminal 51 and the terminal 49 respectively.

The points 55 and 56 respectively are connected directly to the respective rectifiers 60 and 61. The other terminal of the rectifiers 60 and 61 are commonly connected, this common connection indicated by a point 62 is connected directly to the control grid of the triode driver tube 63 which has its cathode connected to ground and its plate connected by the lead 34 to the electrode 33 of the tube 30. Point 62 is connected also through an appropriate resistor to a −100 volt terminal 13.

When the voltage at either of the points 55 or 56 is positive conduction through the corresponding rectifier 60 or 61 is increased. This increased conduction causes the voltage at the point 62 to become sufficiently positive to permit the tube 63 to be plate current conductive. As in the circuit arrangement of Fig. 1 the application of such a negative voltage to the electrode 33 of the tube 30 causes the glow discharge in the gaseous tube counter to advance to the next intermediate cathode. The fact that a positive voltage at either point 55 or 56 is sufficient to cause increased conduction through the tube 63 means that the rectifiers 60 and 61 collectively function as an "or" switch.

Prior to the initiation of a read in cycle a negative pulse is applied to the terminal 15 and switches the input trigger circuit to the "on" condition. Conduction continues through the rectifier 57 and the voltage at the point 55 is still negative in value. Each time a positive input pulse to be stored is applied to the terminal 46 conduction through the rectifier 57 decreases. The voltage at the point 55 becomes positive and causes increased conduction through the rectifier 60. The tube 63 is then rendered conductive and the glow discharge in tube 30 advances to the next intermediate cathode. At the end of the input pulse tube 63 is again cut off and the glow discharge in tube 30 advances to the next succeeding digit cathode to complete the storage of one digit.

This storage process is continued until the desired number of digits are stored at which time a negative pulse is applied to the terminal 14 to switch the input trigger circuit to the "off" condition. The digit input switch including the rectifiers 54 and 57 operable as an "and" switch is thereafter ineffective to effect storage in response to the input pulses.

After the read in cycle is complete the carry gate pulse applied to the terminal 51 causes a positive potential to be applied to rectifier 52. If a carry signal from the next lower order of the accumulator is applied simultaneously to the terminal 49, the voltage at the point 56 is thereby rendered positive and the glow discharge in the counter tube 30 advances as before.

The electrode 37 representative of the digit 9 is connected through capacitor 18 and lead 19 to the cathode of the tube of the carry storage trigger circuit. The negative pulse thus transferred to this cathode when the glow discharge leaves the electrode 37 of the tube 30 effects a switching of the carry storage trigger circuit from the "off" to the "on" condition and thereby provides a positive carry voltage at the terminal 38. Prior to the next read in cycle a negative pulse is applied to the terminal 17 to switch the carry storage trigger circuit to the "off" condition and a negative pulse is applied to the terminal 15 to switch the input trigger circuit to the "on" condition.

It is seen that the circuit arrangement of Fig. 2 functions substantially as that of Fig. 1 and enjoys the advantage that it is cheaper to construct.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a carry circuit; a gaseous storage device of the glow transfer type wherein a glow discharge is transferred in step-by-step fashion from one stable glow position on a digit representing cathode to another such position on another cathode to indicate the digital value stored, said device having cathodes representing the digits 0–9, inclusive; a source of pulses; a digit input switch connected to said source of pulses; switch control means connected to said digit input switch for applying a voltage to condition said digit input switch to be responsive to pulses from said source, and a connection from said digit input switch to said gaseous storage device to effect storage therein each time said digit input switch is rendered responsive; a carry storage circuit connected to the cathode representing the digit 9 and energized when the glow discharge leaves that cathode thereby effecting storage of a carry pulse.

2. A carry circuit as set forth in claim 1 including a plurality of orders wherein each order also includes a carry input switch connected to said gaseous storage device to effect the storage of an additional digit therein each time said carry input switch is rendered responsive; a connection from each carry storage circuit to the carry input switch of the next higher order to condition the latter to be rendered responsive by a subsequent pulse; and pulse means connected to each carry input switch to render the carry input switches responsive.

3. A carry circuit for effecting carry between successive orders of a parallel decade accumulator, each order comprising a gaseous discharge storage tube of the glow transfer type wherein a discharge is advanced from one position of stable discharge to another in response to each preselected electrical manifestation applied to said tube to effect the storage of a digit, a carry storage trigger circuit having two stable conditions alternately assumed and connected to the highest possible glow position of stable discharge to receive a voltage impulse therefrom prior to completion of each decade cycle of storage tube operation to switch said carry storage trigger circuit to one stable condition in response to said discharge being transferred from said highest possible glow position.

4. A carry circuit for effecting carry between successive orders of an accumulator including a gaseous discharge storage tube of the glow transfer type for each said order, ten digit representing cathodes representing the digits 0–9 respectively and arranged in a closed glow transfer path, ten transfer cathodes, one interposed along said path intermediate successive digit representing cathodes; circuit means for each said order including digit read in means for effecting preselected digital storage in said tube so that a glow discharge exists to said digit representing cathode representing the number of digits stored in said tube; a carry storage trigger circuit for each said order having two stable conditions and connected to the digit cathode representing the digit 9 so that when a glow discharge leaves that cathode the carry trigger circuit is switched to one preselected stable condition; a connection from each carry trigger circuit to the digit read-in means of the next higher order to apply a preselected positive voltage to the latter.

5. The carry circuit set forth in claim 4 wherein said digit read-in means includes a coincidence circuit operable upon the simultaneous application thereto of a positive carry gate pulse and said pre-selected positive voltage from the carry storage trigger circuit of the next lower order to effect the storage of a digit in said storage tube; a connection from each carry storage trigger circuit to said coincidence circuit to apply said positive voltage from the former to the latter; and synchronized with the occurrence of said preselected positive voltage for producing and applying said positive carry gate pulse.

6. The carry circuit set forth in claim 4 wherein said circuit means is connected to said transfer electrodes and includes first and second rectifiers having a commonly connected terminal rendered positive upon application of positive voltages to both of said rectifiers to effect the storage of a digit in said storage tube; means for applying a series of positive count pulses to one of said rectifiers; and means for maintaining the remaining rectifier input positive for a period of time corresponding to the digit value to be accumulated and for thereafter rendering said rectifier input negative; and wherein said carry storage trigger circuit is of the secondary emission type using a single electron tube of the multigrid type having a cathode and a dynode, the voltage between the cathode and dynode always being sufficient to create a secondary emission ratio greater than one.

7. The carry circuit set forth in claim 6 including third and fourth rectifiers for each said order, said rectifiers having a commonly connected terminal rendered positive only by the simultaneous application of positive voltages to both the rectifiers; a connection from the carry storage trigger circuit of the next lower order to the other terminal of said third rectifier to render said rectifier conductive; means for pulsing said fourth rectifier at a predetermined carry time; and means coupling said commonly connected terminal of said third and fourth rectifiers to said storage tube to effect the storage of a digit therein when said third and fourth rectifiers are conductive.

References Cited in the file of this patent

UNITED STATES PATENTS

| | | |
|---|---|---|
| 2,473,159 | Lyman | June 14, 1949 |
| 2,484,115 | Palmer | Oct. 11, 1949 |
| 2,502,360 | Williams | Mar. 28, 1950 |
| 2,516,915 | Reeves | Aug. 1, 1950 |
| 2,528,100 | Williams | Oct. 31, 1950 |
| 2,537,427 | Seid | Jan. 9, 1951 |
| 2,591,008 | Rench | Apr. 1, 1952 |
| 2,607,891 | Townsend | Aug. 19, 1952 |
| 2,624,507 | Phelps | Jan. 6, 1953 |
| 2,675,504 | Wales | Apr. 13, 1954 |
| 2,706,597 | Crosman | Apr. 19, 1955 |

OTHER REFERENCES

"Polycathode glow tube for counters and calculators," Electronics Magazine, November 1949, pp. 92–96.

Proc. of the IRE, vol. 36, No. 8, "Megacycle Stepping Counter," by C. B. Leslie, pp. 1030 through 1034.

"Electrical Communications," September 1950, "Multicathode gas-tube counters," by Hough and Hidler, pp. 214–226.